(12) United States Patent
Ogata

(10) Patent No.: US 6,175,538 B1
(45) Date of Patent: Jan. 16, 2001

(54) DISK RECORDING OR PLAYBACK DEVICE AND METHOD OF ADJUSTING INITIAL POSITION OF PICKUP THEREOF

(75) Inventor: Hitoshi Ogata, Sakai (JP)

(73) Assignee: Sanyo Electric Co., Ltd., Moriguchi (JP)

( * ) Notice: Under 35 U.S.C. 154(b), the term of this patent shall be extended for 0 days.

(21) Appl. No.: 09/405,140

(22) Filed: Sep. 24, 1999

(30) Foreign Application Priority Data

Sep. 28, 1998 (JP) ................................................ 10-273314

(51) Int. Cl.⁷ .................................................... G11B 17/22
(52) U.S. Cl. ............................ 369/32; 369/54; 369/44.35
(58) Field of Search ................................. 369/32, 13, 54, 369/58, 44.34, 44.35, 44.36, 124, 116, 47, 48

(56) References Cited

U.S. PATENT DOCUMENTS 5,878,015 * 3/1999 Schell et al. ......................... 369/116
6,069,857 * 5/2000 Schell et al. ............................ 369/54

FOREIGN PATENT DOCUMENTS 0 463 720 A2    1/1992   (EP) .

* cited by examiner

Primary Examiner—Ali Neyzari
(74) Attorney, Agent, or Firm—Armstrong, Westerman, Hattori, McLeland & Naughton

(57) ABSTRACT

A disk recording or playback device first sets a target region, and a pickup is moved toward the disk inner periphery to turn on a sensor switch. The pickup is thereafter reversely moved, and further caused to overrun for a predetermined period of time from the position where the sensor switch is turned off. The pickup is returned after reading the address reached by overrunning. If the address is closer to the disk outer periphery than the target region, the overrun time is decreased, and the movement of the pickup toward the lead-in area is repeated again. When the overrun time becomes not greater than a specified value and if the address then read is closer to the disk outer periphery than the target region, the direction of overrun is reversed toward the disk inner periphery. The overrun time enabling the pickup to reach the target region accurately is saved.

6 Claims, 19 Drawing Sheets

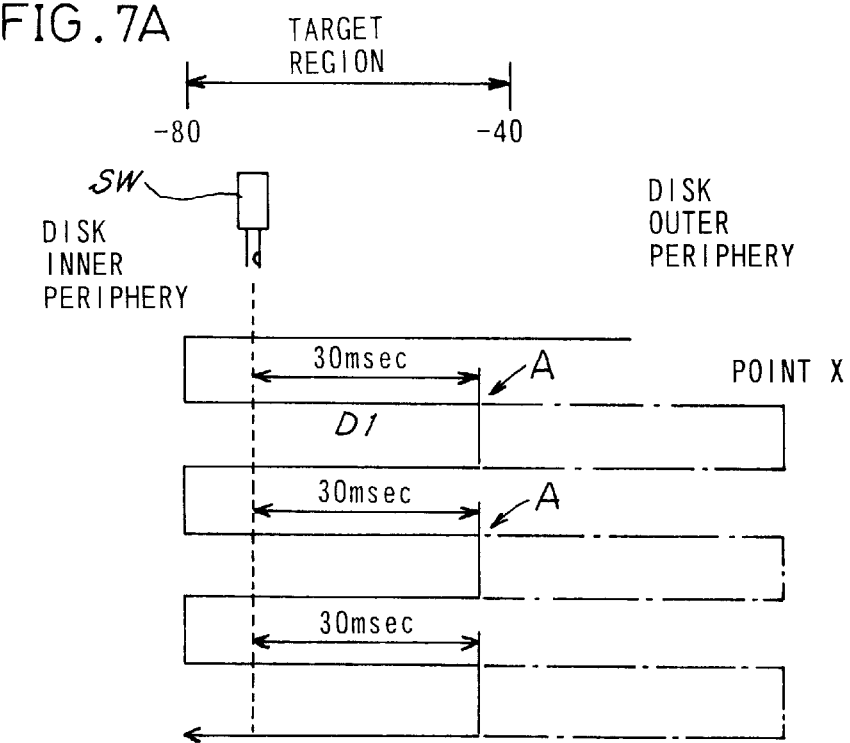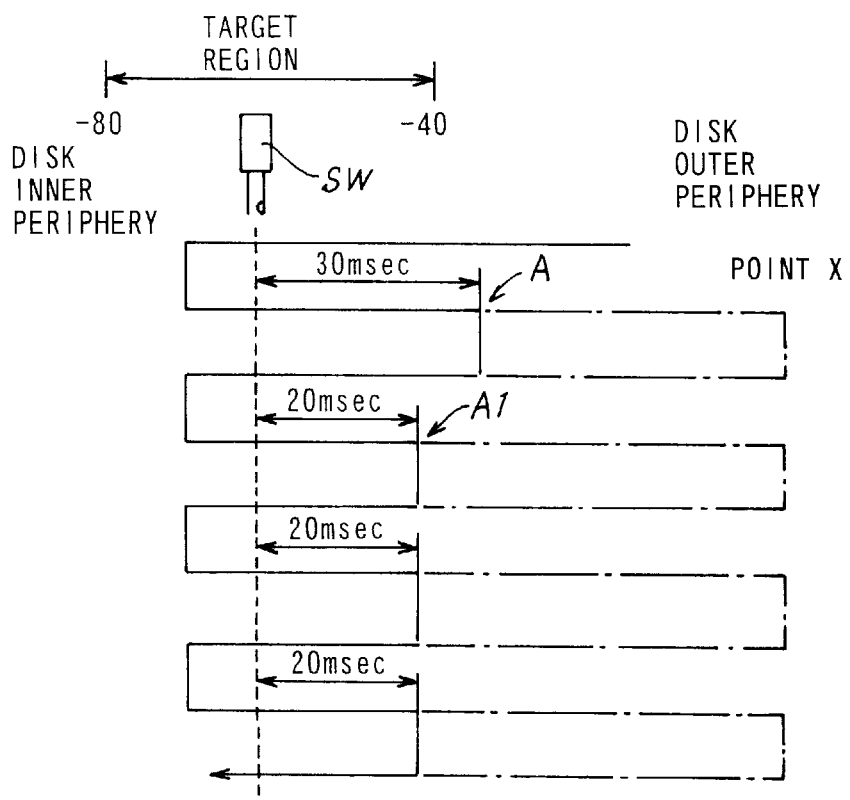

DISK RECORDING OR PLAYBACK DEVICE AND METHOD OF ADJUSTING INITIAL POSITION OF PICKUP THEREOF

FIELD OF THE INVENTION

The present invention relates to devices by which information is recorded on or reproduced from disks, and a method of adjusting the initial position of the pickup of the device.

BACKGROUND OF THE INVENTION

FIG. 2 shows a mechanism deck 2 already known for use in such disk recording or playback devices. The deck 2 comprises a chassis 4 formed with an opening 40, two guide rods 41, 41 extending across the opening 40, and a turntable 31 provided at an end portion of the opening 40 for rotating a disk. A pickup 3 having an object lens 30 is movably mounted on the two guide rods 41, 41. The pickup 3 is driven by a motor (not shown) on the chassis 4. Provided inside the opening 40 close to the turntable 31 is a sensor switch SW for detecting the pickup 3 as brought closest to the inner periphery of the disk.

The disk 6 is housed in a cartridge 60, which is provided with a movable shutter 61. With the cartridge 60 placed on support pins 42 on the chassis 4, the shutter 61 slidingly moves to expose the disk 6, whereupon a beam is projected from the lens 30 of the pickup 3 on the disk rear surface to record or reproduce signals.

With reference to FIG. 3, the disk 6 is 64 mm in outside diameter and 29 mm in inside diameter. An inner peripheral region ranging from 29 mm to 32 mm in diameter is referred to as a lead-in area A, a region ranging from 32 mm to 61 mm in diameter as a program area B, and an outer peripheral region ranging from 61 mm to 64 mm (outer periphery) in diameter as a lead-out area C. The lead-in area A is an area having recorded therein a so-called TOC (table of contents) which is a summary of the information recorded on the disk. For the recognition of the position of the pickup 3, the lead-in area A invariably has signals recorded therein as will be described later. The program area B has recorded therein desired information such as music signals. Detection of a signal recorded in the lead-out area C by the pickup 3 indicates that the pickup 3 has moved out of the program area B beyond the outer periphery thereof.

In a standby state for recording or playback, the pickup 3 is designed to be positioned in the lead-in area A in contact with the sensor switch SW. This position will be referred to as an initial position. The pickup 3 reads the TOC data, recognizes the initial position and thereafter moves the beam spot to a desired address for recording or reproducing signals. For accurate reading of signals from the disk, it is necessary to activate a focus servo for focusing the beam on the disk, a tracking servo for accurately tracking record grooves in the disk and a speed servo for rotating the disk at a constant speed based on a synchronization signal recorded on the disk.

If no signal is recorded at the location on which the beam is projected first, the speed servo can not be activated because of the absence of the synchronization signal, consequently effecting no recording or playback operation. The pickup 3 needs to be positioned correctly in the lead-in area A initially before activating the speed servo.

However, the conventional device has the following problem.

Mass production of devices of the type described involves variations in the position or angle of the sensor switch SW as mounted on the chassis 4, therefore entailing the likelihood that the pickup 3 will not be positioned correctly in the lead-in area when halted on pressing the sensor switch SW. It is also likely that the pickup 3, which is driven by a motor (not shown), will not be located in the lead-in area initially even if the sensor switch SW is correctly installed in place because the distance the pickup 3 moves through inertia after pressing the sensor switch Sw until the pickup comes to a halt differs owing to variations in the drive force of the motor or to variations in the moving load of the pickup 3. This problem may be overcome by checking the mechanism decks 2 individually, for example, for the installed position of the sensor switch SW, whereas this procedure requires time and labor.

SUMMARY OF THE INVENTION

An object of the present invention is to reliably position the pickup in the lead-in area when the pickup is in the standby state for recording or playback.

The invention provides a disk recording or playback device which comprises a pickup 3 movable along the signal recording surface of a disk for detecting signals and addresses on the disk, and a sensor switch SW for detecting the pickup 3 as brought to the inner peripheral side of the disk.

The flow charts of FIGS. 10 and 12 show the outline of the present invention. First, a target region where the pickup 3 is to be positioned initially is provided in the lead-in area A of the disk.

The pickup 3 is moved from the inner periphery of the disk toward the outer periphery thereof, and caused to overrun further toward the disk outer periphery (S3) for a predetermined period of time (S1) after the sensor switch SW detects the passage of the pickup 3.

The pickup 3 reads the address of point A on the disk upon the completion of overrun (S5), and is thereafter returned toward the inner periphery and halted upon the sensor switch SW detecting the passage of the pickup 3.

The overrun time is corrected to a shorter period (S11, S12) if the address A is closer to the disk outer periphery than the target area. The overrun time is corrected to a longer period (S10, S15) if the address A is closer to the disk inner periphery than the target region. The movement of the pickup 3 toward the disk outer periphery is repeated again, and the overrun time is stored which eventually enables the pickup to reach the target region (S19).

When the overrun time is decreased to not longer than a reference time t1 (S16) by repeating shortening of the overrun time and if the address A then read is closer to the disk outer periphery than the target area, the direction of overrun is reversed (S17), the pickup 3 is moved toward the disk inner periphery, shortening or lengthening of overrun time is repeated, and the overrun time is saved which eventually enables the pickup 3 to be positioned in the target region (S19).

Before recording or playback is started again, the pickup 3 is moved outward from the disk inner peripheral side and thereby moved from the position of detection of the pickup 3 by the switch SW for the stored period of overrun time.

Thus, when an overrun time is set for every recording or playback device to position the pickup 3 thereof in the target region in a standby state before recording or playback is started, the pickup is capable of accurately reading the TOC signals. This sets the pickup 3 in an ideal initial position to subsequently ensure a smooth recording or playback operation.

BRIEF DESCRIPTION OF THE DRAWINGS

FIGS. 7A and 7B are diagrams showing relationships in position between a sensor switch and a target area according to the first embodiment;

DESCRIPTION OF THE PREFERRED EMBODIMENTS

[Outline of the Device]

An embodiment of the invention will be described below in detail with reference to the drawings concerned.

Figure 1:
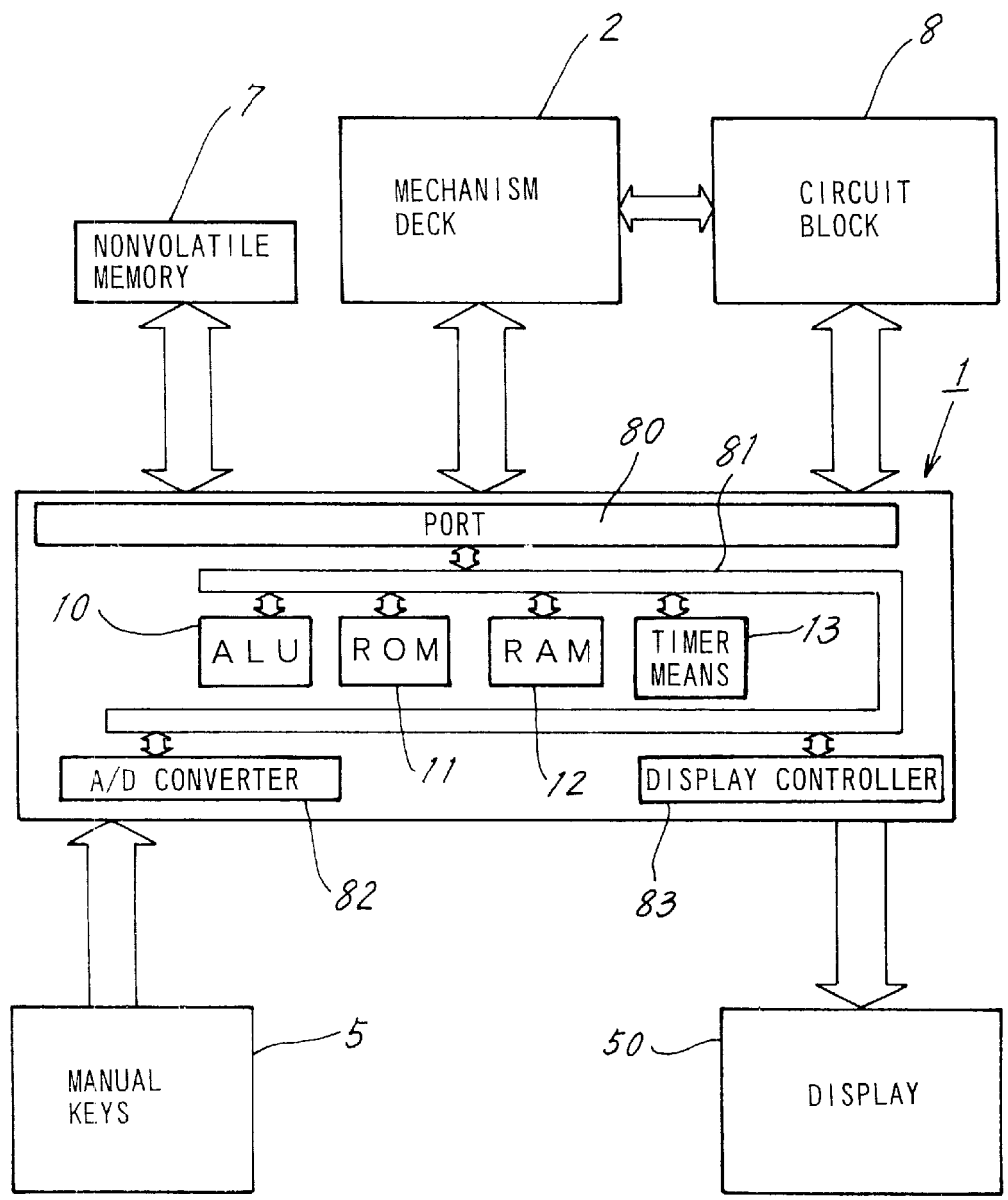
FIG. 1 is a block diagram showing the interior of a disk recording or playback device.
Figure 2:
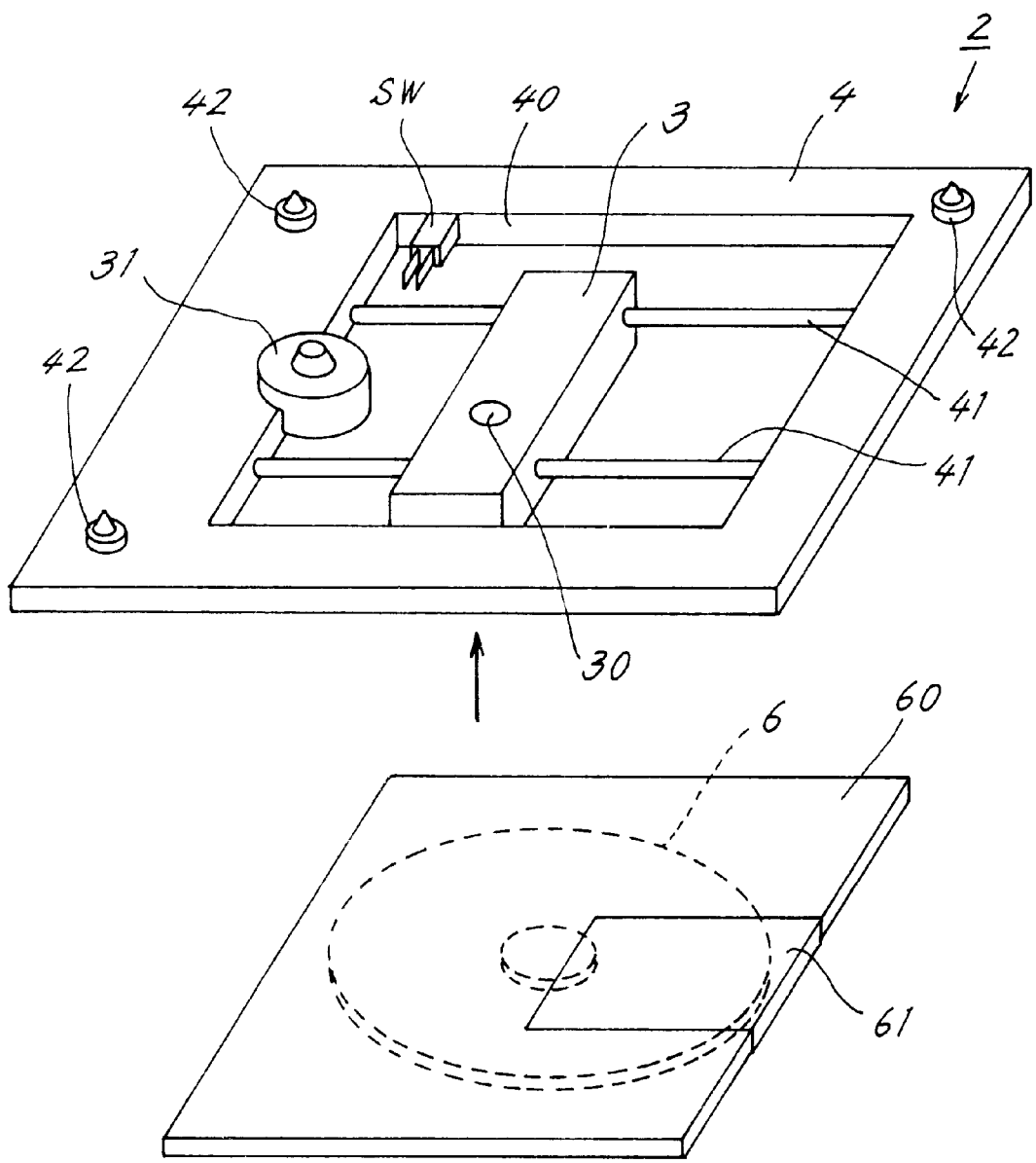
FIG. 2 is a perspective view of a known mechanism deck.
Figure 21:
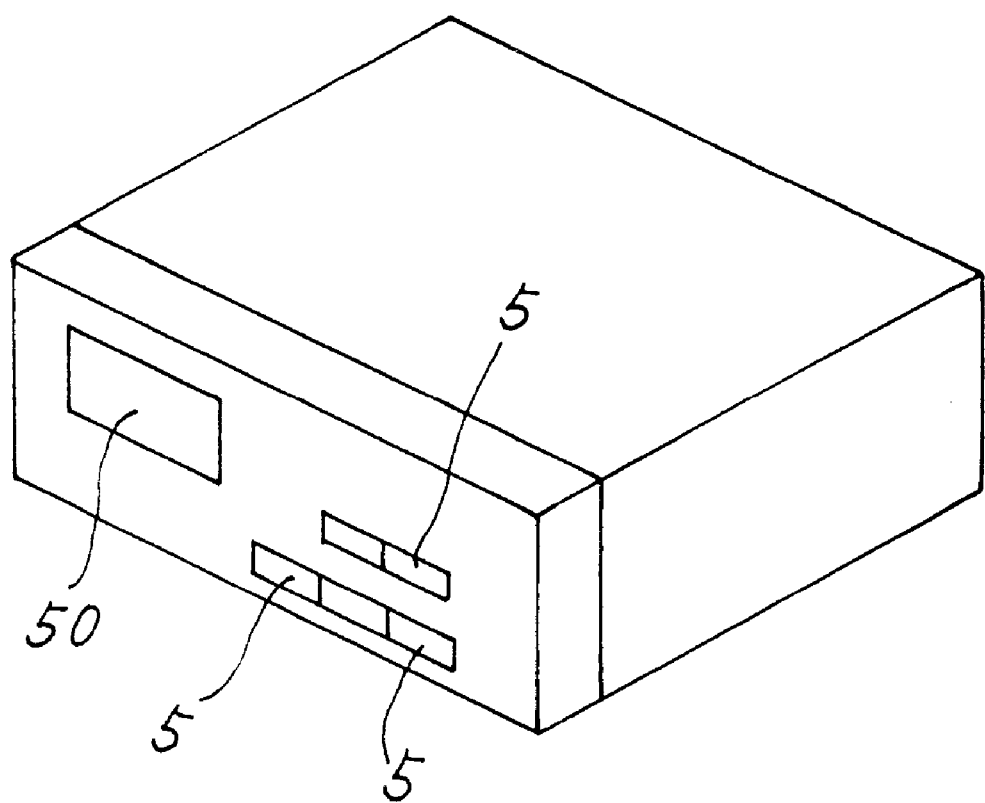
FIG. 21 is an overall perspective view of a conventional disk recording or playback device.

FIG. 1 is a block diagram showing a disk recording or playback device in its entirety. The device comprises as connected to a microcomputer (hereinafter referred to merely as the "computer") 1 a nonvolatile memory 7, mechanism deck 2, circuit block 8, manual keys 5 to be manipulated by the user, and display 50 (see FIG. 21) for showing the state of the device in operation. The mechanism deck 2 has the same construction as the one shown in FIG. 2.

The computer 1 has incorporated therein an arithmetic and logic unit (hereinafter referred to as "ALU") 10, ROM 11 having stored therein an operating program, RAM 12 for storing the overrun time and count to be described later and timer means 13 for measuring predetermined periods of elapsed time, which are connected by a bus line 81. The nonvolatile memory 7, mechanism deck 2 and circuit block 8 are connected via ports 80 to the bus line 81. The display 50 is connected to the bus line 81 via a display controller 83, and the manual keys 5 are connected to the line 81 via an A/D converter 82. The circuit block 8 comprises a signal compression-expansion circuit of the ATRAC (Adaptive Transform Acoustic Coding) type standardized for use in such disk recording or display devices, and the circuits of focus servo, tracking servo and speed servo described, and is electrically connected to the mechanism deck 2. Stored in the nonvolatile memory 7 is the overrun time for the motor for driving a pickup 3.

The term the "focus servo" refers to a servo for delicately moving the lens 30 of the pickup 3 upward or downward for focusing a beam from the lens 30 on the rear surface of a disk. The known astigmatism method is mainly used for the servo. The term the "tracking servo" refers to controlling the position of the beam so that the focus of the beam correctly tracks the pits in the disk. The known beam method or push-pull method is used. The term the "speed servo" refers to controlling the rotation of the disk so as to give the disk a constant linear speed of 1.4 m/sec. The servo is activated based on the difference between a reference signal on the disk and a reference signal on the circuit.

In the following description, activating the focus servo, tracking servo and speed servo in sequence will be referred to as "turning on the servo," and inactivating the servos as "turning off the servo."

Figure 3:
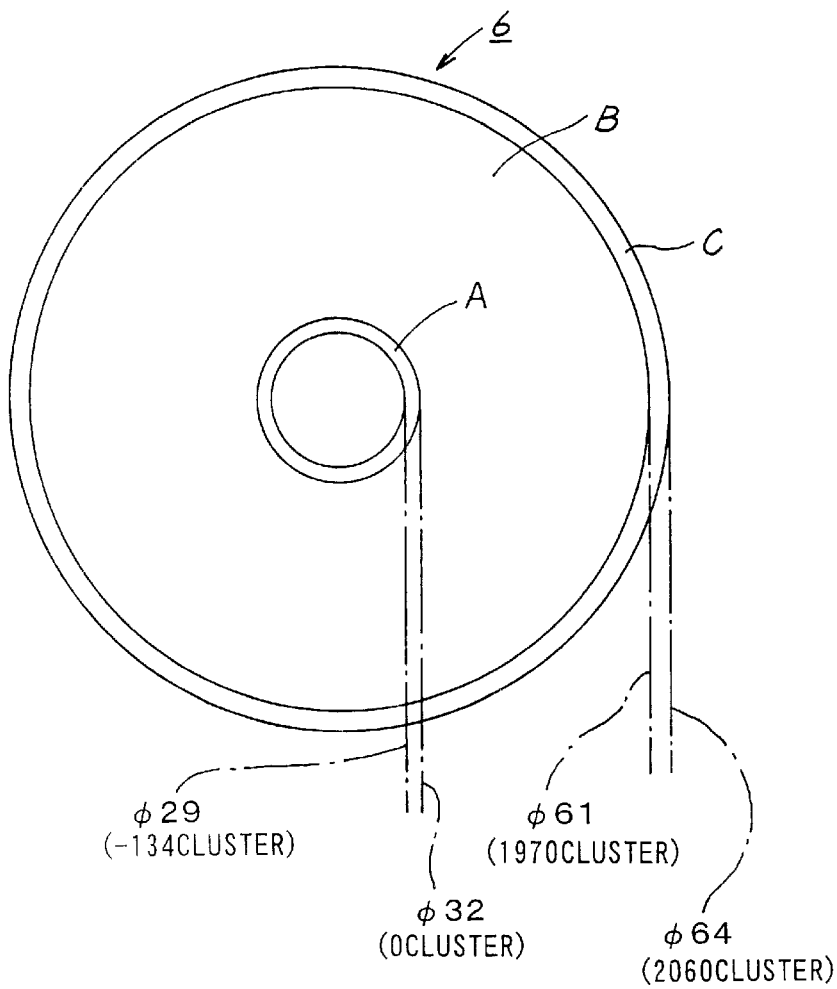
FIG. 3 is plan view of a disk.
Figure 4:
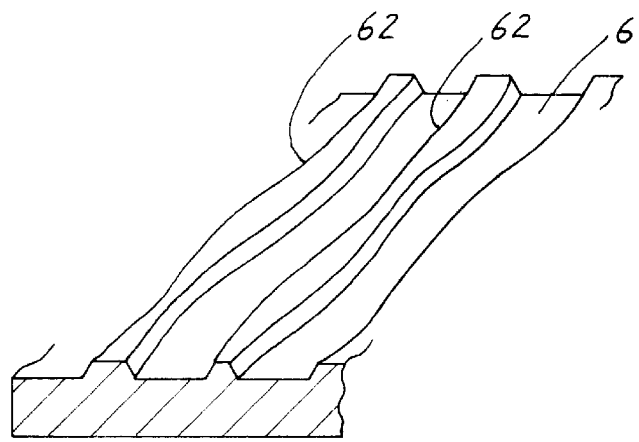
FIG. 4 is a perspective view of pregrooves in the disk.

As shown in FIG. 4, the disk of the type described has grooves called pregrooves 62 and formed over the entire area of its rear surface circumferentially thereof except the lead-in area (A, in FIG. 3), the grooves extending slightly zigzag. The zigzag groove provides an address every distance of movement corresponding to 13.3 msec, and the address is detectable even when no data is recorded on the disk. In place of pregrooves 62, pits (not shown) are formed in the lead-in area.

Figure 5:
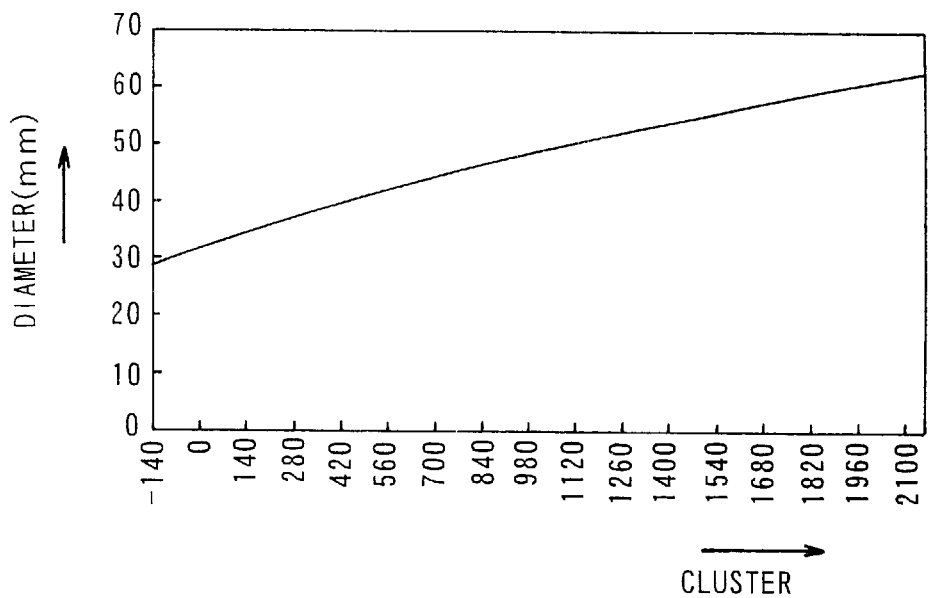
FIG. 5 is a graph showing the relationship between the address and the disk diameter.

With disks of the type described, a particular location on the disk is expressed in cluster. The distance of movement corresponding to 13.3 msec is termed one sector, and 36 sectors correspond to the distance of one cluster. The disk has a location of 0 cluster on a phantom circle with a diameter of 32 mm. The smallest cluster is −134 cluster on a phantom circle with a diameter of 29 mm, and the largest cluster is 2060 cluster on a phantom circle with a diameter of 64 mm. The graph of FIG. 5 shows the relationship between the diameter of the disk and the cluster. The diameter of 0 mm refers to the center of the disk.

For recording or playback, a beam spot is first projected on the rear surface of the disk from the lens 30 of the pickup 3, and the focus servo is activated to focus the beam on the disk rear surface. The tracking servo and speed servo are thereafter activated, moving the lens 30 in a plane opposed to the rear surface of the disk. After address data is read, the lens 30 or the pickup 3 is moved to move the beam to a desired address to read a desired signal.

If the pickup 3 is not positioned in the lead-in area (A in FIG. 3) when starting recording or playback, the synchronization signal is not detectable, and the speed servo can not therefore be activated as previously described, with the result that the pickup is unable to operate for recording or playback.

According to the invention, the initial position of the pickup 3 is adjusted by methods shown in the flow charts to be described later to position the pickup 3 in a standby state in the lead-in area.

Since the position of the sensor switch Sw relative to a target region has yet to be determined, the pickup 3 is first moved outward, whereupon the address of the location is detected, and the pickup 3 is returned. This procedure is repeated to determine the position where the pickup 3 is to be in a standby state initially.

The target region where the pickup 3 is to be positioned in the standby state is set in advance at the region of −80 to −40 cluster within the lead-in area. The program to be executed and shown in the flow charts is stored in the ROM 11 in the computer 1. The program is read by the ALU 10.

In the following description, a further advance of the pickup 3 beyond the position where the pickup 3 actuates the sensor switch SW will be referred to as an "overrun." The duration of overrun, i.e., overrun time, which is determined by the computer 1, has a positive or negative value for convenience of calculation by the computer 1. The direction of movement of the pickup 3 changes to the opposite depending on whether the overrun time is positive or negative, whereas the duration of the actual overrun is an absolute value of time calculated by the computer 1.

The RAM 12 in the computer 1 has stored therein 30 msec as the time taken for the pickup to move an overrun distance of D1. The period of 30 msec is stored because it has empirically found that the position of the target region set relative to the sensor switch SW is very likely to vary within the range of movement of the pickup 3 corresponding to about 30 msec.

As will be described later, the method of adjusting the initial position differs depending on whether the pickup 3 is caused to overrun toward the disk inner periphery or the disk outer periphery after moving past the sensor switch SW. The control to cause the pickup 3 to overrun initially toward the disk outer periphery will be referred to as a first embodiment, and the control to cause the pickup 3 to overrun initially toward the disk inner periphery will be referred to as a second embodiment.

[First Embodiment]

FIGS. 7A, 7B, 8 and 9 are diagrams showing relationships between the sensor switch SW and the target region. With this embodiment, the pickup 3 is moved toward the disk outer periphery when the overrun time provided by the computer 1 is a positive value, or toward inner periphery when the time is a negative value.

Figure 10:
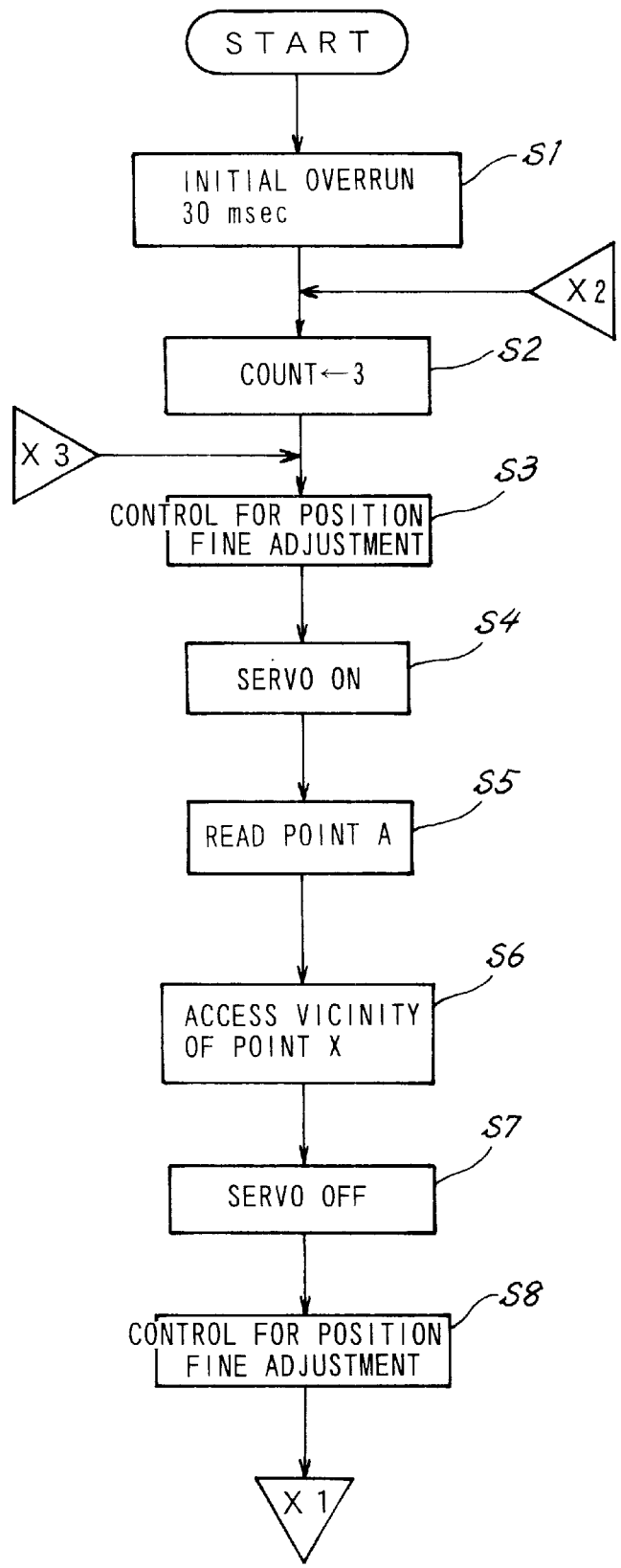
FIGS. 10 to 12 are flow charts showing a method of adjusting the initial position of a pickup.
Figure 12:
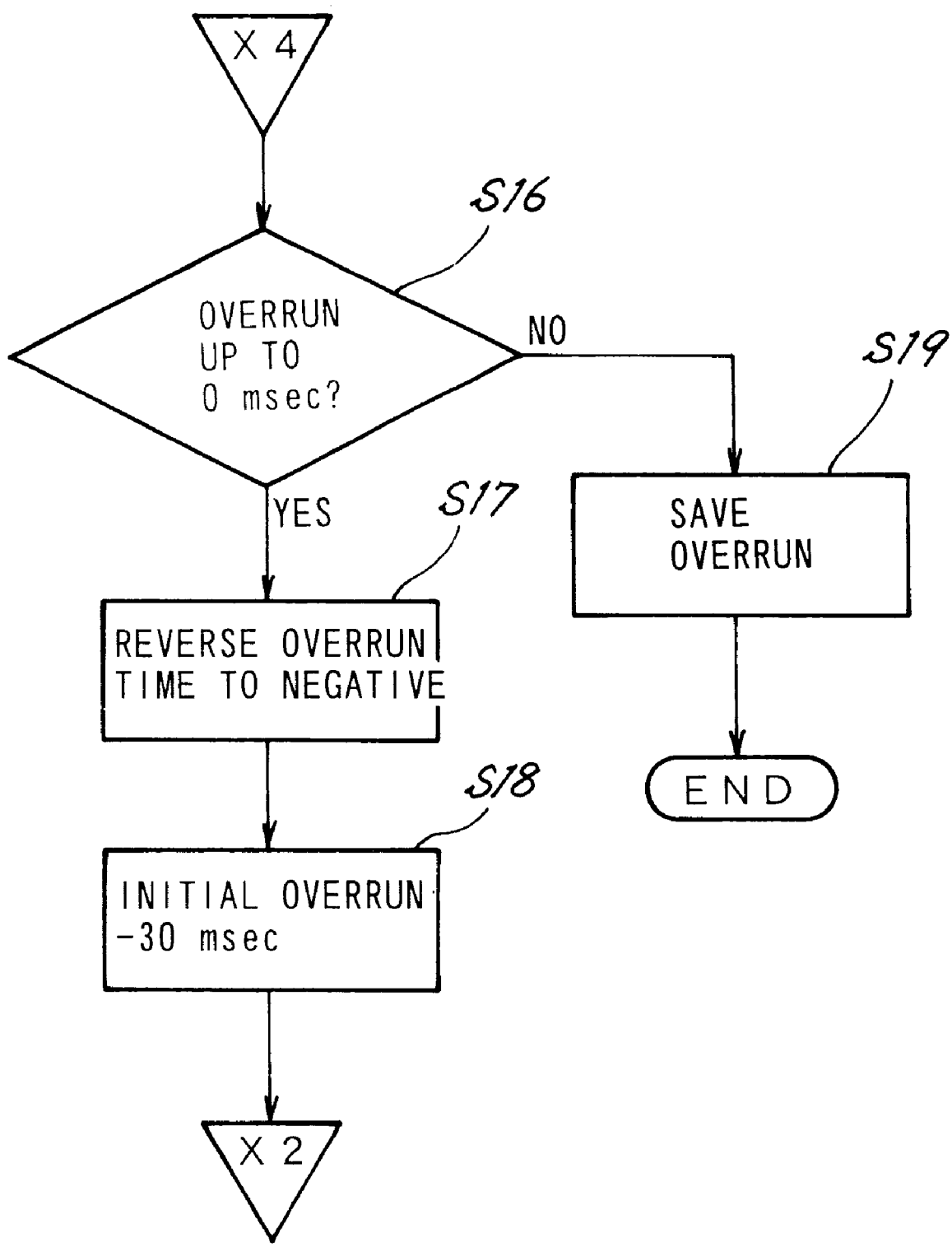

FIGS. 10 and 12 are flow charts showing a procedure for adjusting the initial position of the pickup 3 according to the first embodiment. This procedure involves control for the fine adjustment of the position.

Control for Position Fine Adjustment

The control for position fine adjustment is an operation for reciprocatingly moving the pickup 3 by very small amounts upon detecting the sensor switch SW as turned on and off. This operation is shown specifically in FIG. 6A and in the flow chart of FIG. 13. The pickup 3 is positioned as moved toward the disk outer periphery in advance. First, ALU 10 reads the overrun time stored in RAM 12, and the pickup 3 is moved inward (S20) to turn on the sensor switch SW (S21, point AA). This reverses the direction of rotation of the motor for driving the pickup 3. However, the pickup comes to a halt after moving past the switch by B1 (point BB) owing to the chattering treatment of the switch detection and the inertia of movement of the pickup 3. The sensor switch SW remains on.

At this time, the servo is off, and the address of point BB is not read by the pickup 3. After overrunning by B1, the pickup 3 has the direction of its movement reversed (C1) and moves toward the disk outer periphery (S22).

When the sensor switch SW is turned off, that is, when the pickup 3 leaves the switch SW, the overrun time previously read from the RAM 12 is checked as to whether it is positive or negative (S24). If the overrun time is positive, the pickup 3 is moved toward the disk outer periphery a distance D1 corresponding to the overrun time, and brought to a halt as indicated in a solid line in FIG. 6A (point A, S28, S29).

Figure 6A:
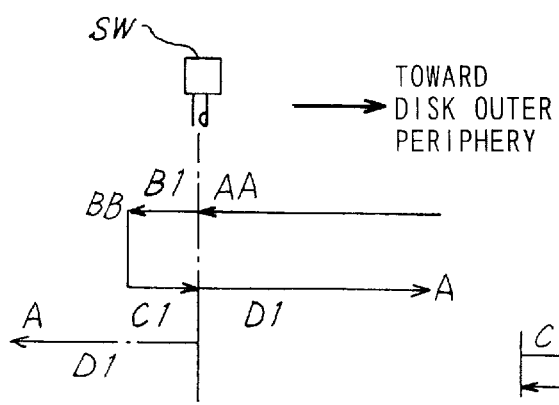
FIG. 6A is a diagram showing control for the fine adjustment of position according to a first embodiment.

If the overrun time is found to be negative in step S24, the pickup 3 is moved toward the disk inner periphery from the position where the pickup turns off the sensor switch SW as indicated in a chain line in FIG. 6A (S25). After the switch SW is turned on (S26), the pickup 3 is moved toward the inner periphery an overrun distance D1, and brought to a stop (S27, S29). Incidentally, the position where the sensor switch SW is turned off is approximately in coincidence with point AA since the amount of movement C1 is very small.

Adjusting Procedure

Figure 11:
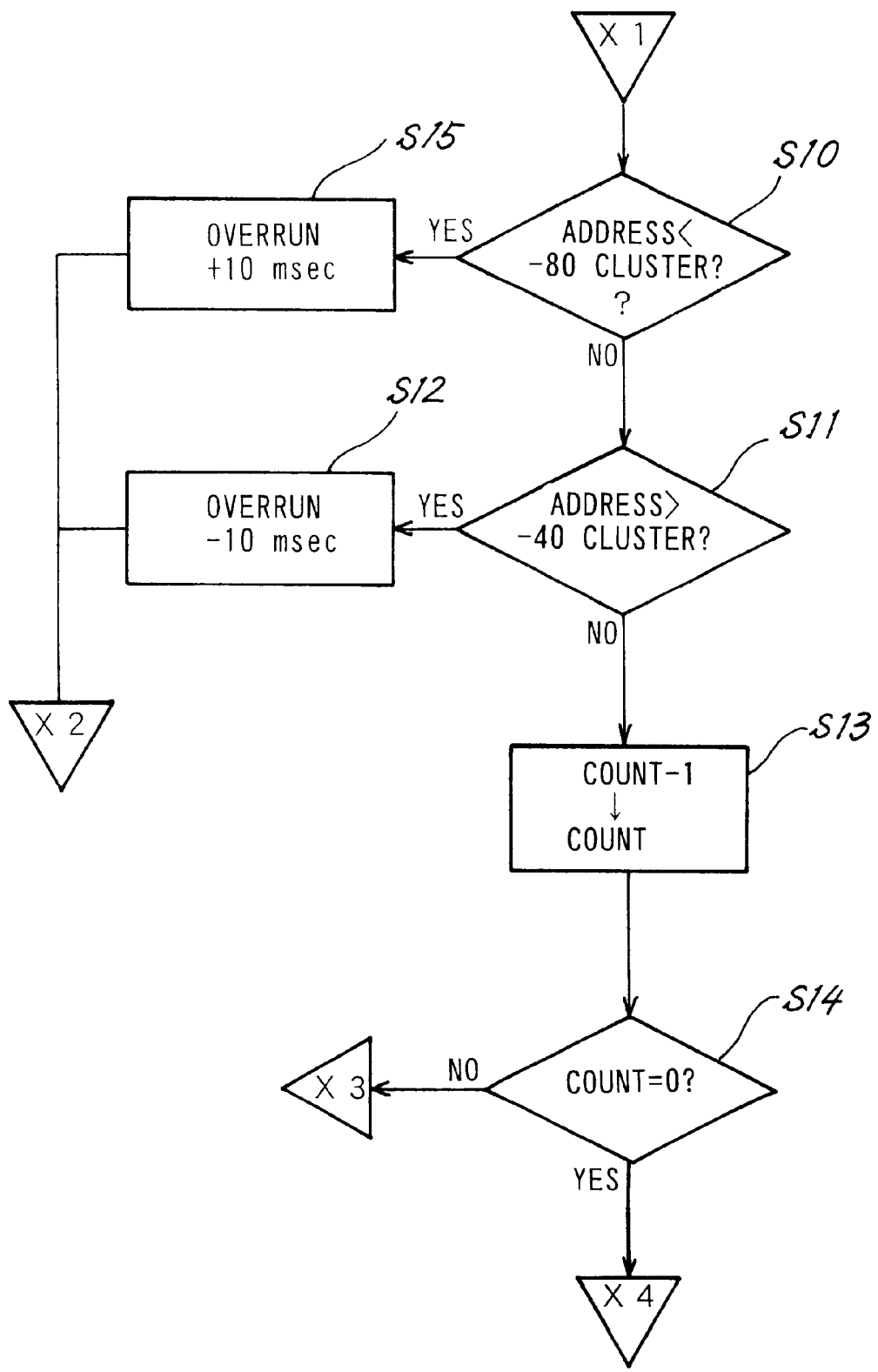

The flow charts of FIGS. 10 to 12 will be described step by step.

First, the ALU 10 sets a count at 3 (S2). The count is the number of times the control for position fine adjustment is repeatedly effected subsequently. Since the pickup 3 is likely to read different addresses, for example owing to reading errors, the control is repeated three times to obtain reliable overrun time.

Next, the ALU 10 reads the time corresponding to the overrun distance D1 from the RAM 12 to effect the position fine adjustment control described (S3). The pickup 3 is moved for 30 msec after the sensor switch SW is turned off. This time measurement is done by the timer means 13 (see FIG. 1) in the computer 1.

After the pickup 3 is halted upon lapse of the overrun time, the servo is turned on (S4), and the address of the location (point A) where the pickup 3 is at a halt is recognized (S5). After the servo is turned on, the pickup 3 is further moved toward the disk outer periphery to point X, more specifically to a location in the vicinity of 200 cluster (S6) as indicated in a chain line in FIGS. 7A or 7B. The servo is turned off after the pickup 3 is brought to a stop (S7).

The pickup 3 is thus caused to overrun to point X because when moved a very small distance corresponding to the overrun time of about 30 msec, the pickup 3 subsequently fails to move at a stabilized speed. If the pickup 3, which is driven by a motor, is moved by a small amount, the motor fails to give stabilized drive torque. The pickup 3 is therefore caused to overrun further so as to be movable at a stabilized speed.

Next, the pickup 3 is returned to the disk inner periphery, and the control for position fine adjustment is executed again (S8). After the pickup 3 presses the sensor switch SW and is halted, the pickup 3 is moved toward the disk outer periphery again.

When Address A is in Target Region

When the address of point A read in step S5 is within the target region as shown in FIG. 7A, the sequence proceeds through steps S10, S12 to step S13, in which 1 is subtracted from the count, followed by step S3 again. This operation is repeated three times (S14). When the count is 0 (S14), indicating that the repetition of the control for position fine adjustment has been completed, the overrun time, i.e., 30 msec, is stored in the nonvolatile memory 7 (S19). This storage operation is performed by the ALU 10 according to the program stored in the ROM 11.

When Address A is Beyond Target Region

When the address of point A read in step S5 is toward the outer periphery beyond the target region (S11) as shown in FIG. 7B, the pickup 3 is positioned beyond the target region, and 10 msec is therefore subtracted from the overrun time (S12), whereupon the sequence returns to step S2.

When Address A is Short of Target Region

Figure 8:
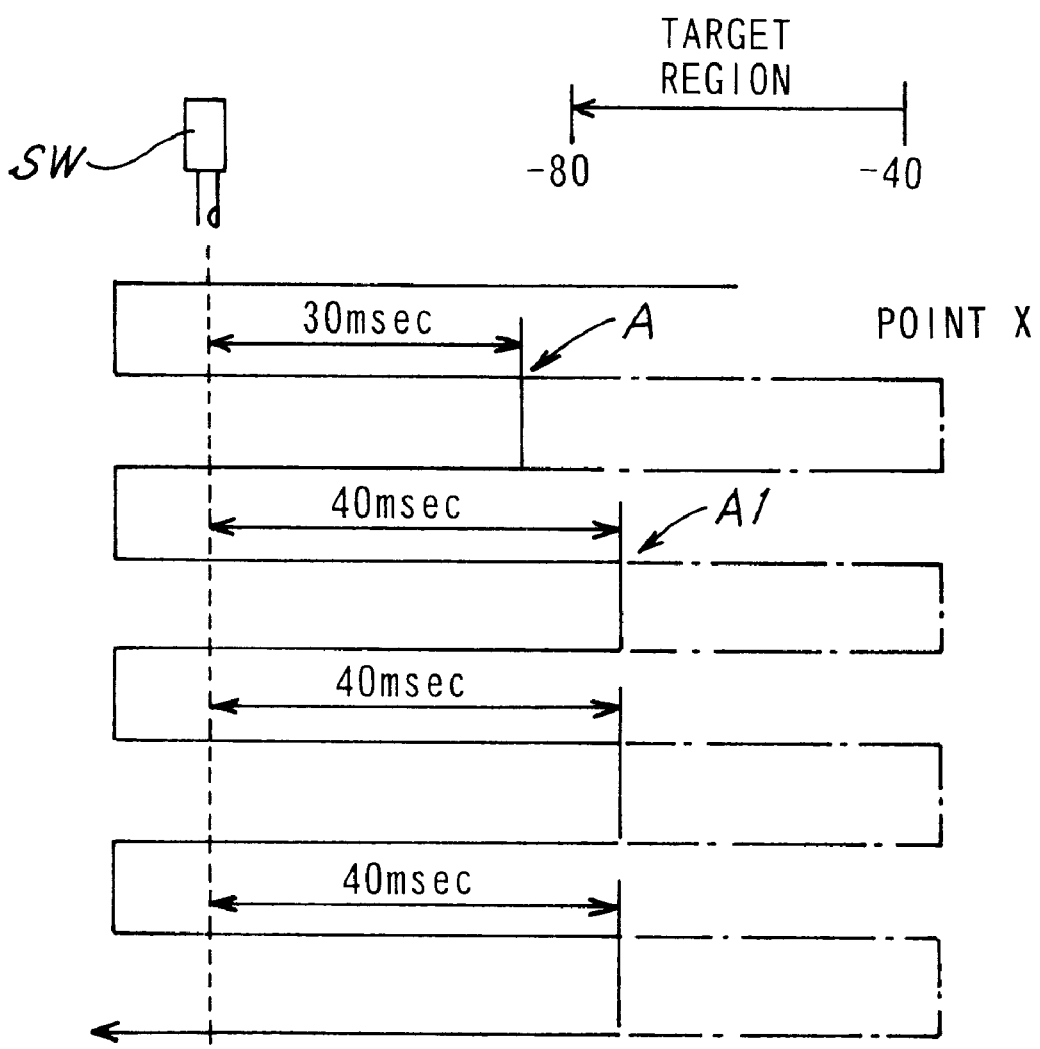
FIG. 8 is a diagram showing another relationship in position between the sensor switch and the target area according to the first embodiment.

If the address of point A read in step S5 is toward the inner periphery outside the target region (S10) as shown in FIG. 8, the pickup 3 has not reached the target region, so that 10 msec is added to the overrun time (S15), followed by step S2 again.

When the pickup 3 is positioned within the target region, the control for position fine adjustment is repeated in the same manner as above, and the overrun time is stored in the nonvolatile memory 7 (S19).

When Overrun Time is Shortened to 0 Second

Figure 9:
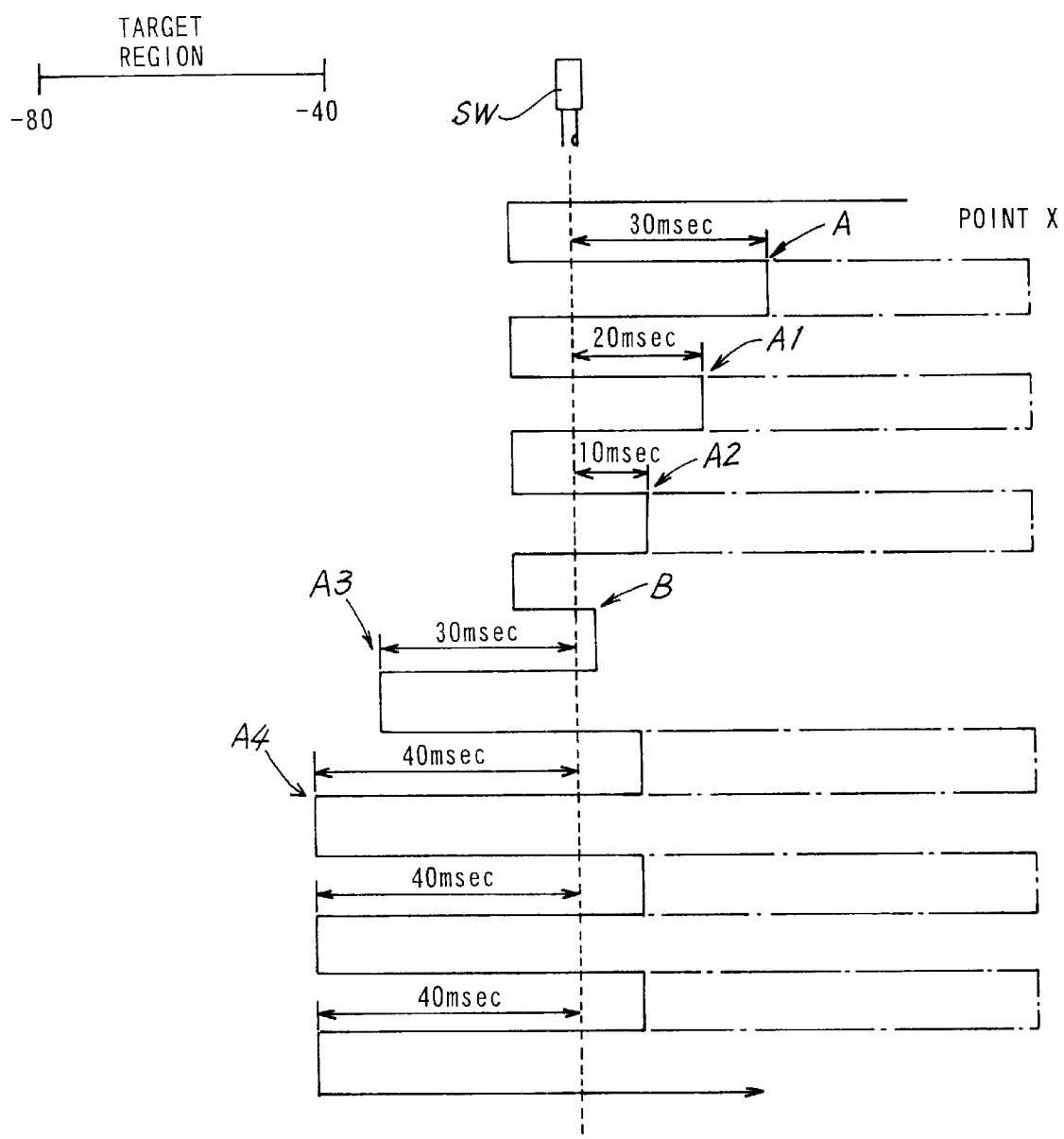
FIG. 9 is a diagram showing another relationship in position between the sensor switch and the target area according to the first embodiment, the relationship being reverse to that shown in FIG. 8.

When the target area is positioned closer to the disk inner periphery than the sensor switch SW as shown in FIG. 9, the pickup 3 is reciprocatingly moved three times with 10 msec subtracted from the overrun time every time, consequently reducing the overrun time to 0 msec, whereas the address to be read is in the vicinity of point B, and the pickup 3 is not positioned in the target area (S16). Point B is a location to which the pickup 3 slightly moves toward the disk outer periphery through inertia after turning off the sensor switch SW.

At this time, the ALU 10 reverses the overrun time to be read from the RAM 12 to negative (S17). As previously stated, the overrun time has a positive or negative value for convenience of calculation by the computer 1, and the actual overrun time is the absolute value of the time.

Figure 13:
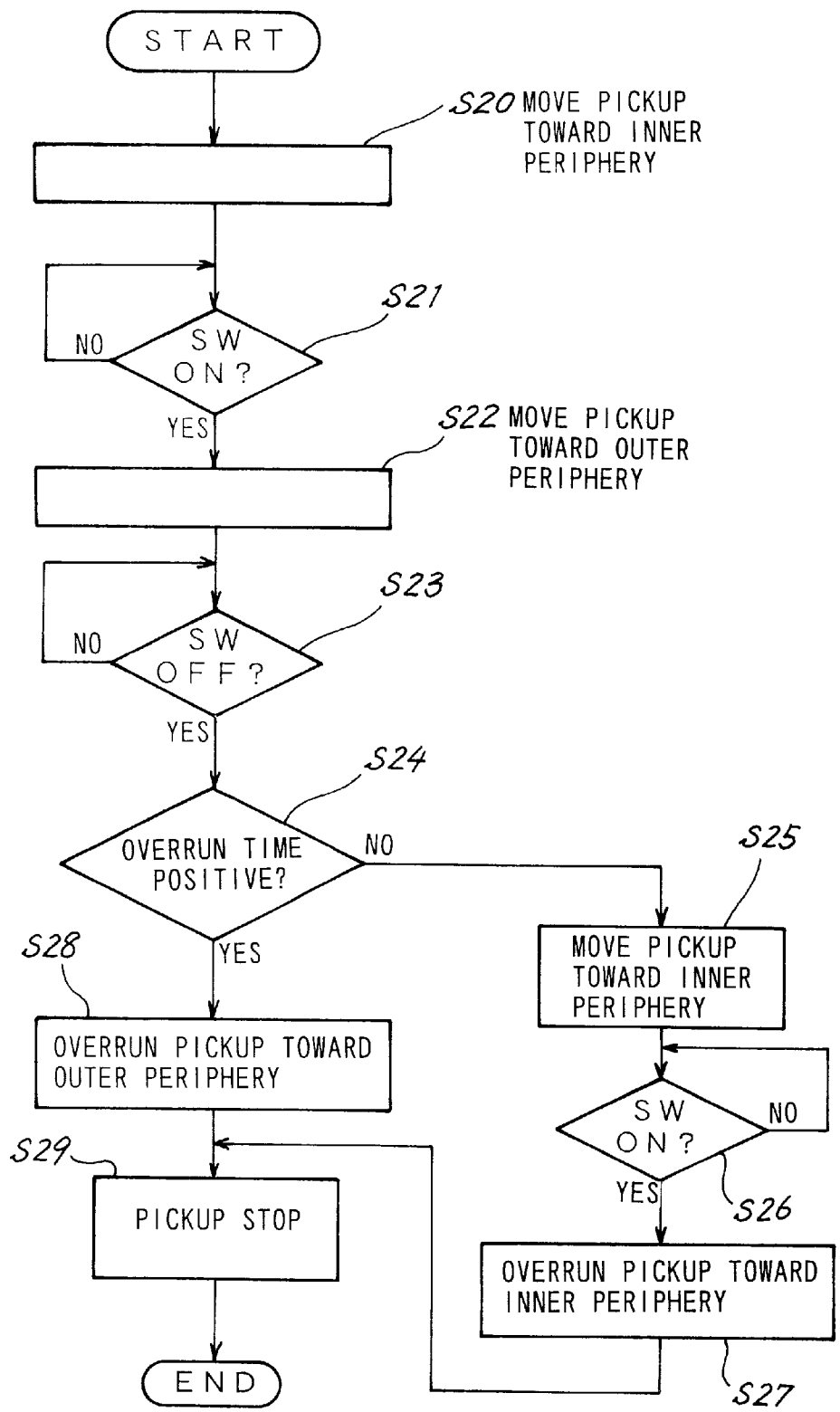
FIG. 13 is a flow chart of the position fine adjustment control of the first embodiment.

When the overrun time is made negative, the pickup 3 is caused to overrun toward the disk inner periphery (FIG. 13, steps S24 to S27). The overrun time to be set initially becomes −30 msec (S18), followed by step S2 again.

After the pickup 3 is halted upon lapse of the overrun time, the servo is turned on (S4), and the address is read (S5). The servo is turned off (S7), the pickup 3 is moved toward disk outer periphery. After the sensor switch SW is turned off, the address is compared with the target region.

When the address A3 read by the pickup 3 halted is closer to the disk outer periphery than the target region, i.e., when the address is greater than −40 cluster, as seen in FIG. 9, 10 msec is subtracted from the overrun time to obtain an overrun time of −40 msec (S12), whereupon the sequence returns to step S2. If the pickup 3 is positioned in the target region as indicated at point A4 in FIG. 9, the address detecting operation is repeated three times according to the count, and the overrun time is saved in the nonvolatile memory 7 (S19).

Figure 20:
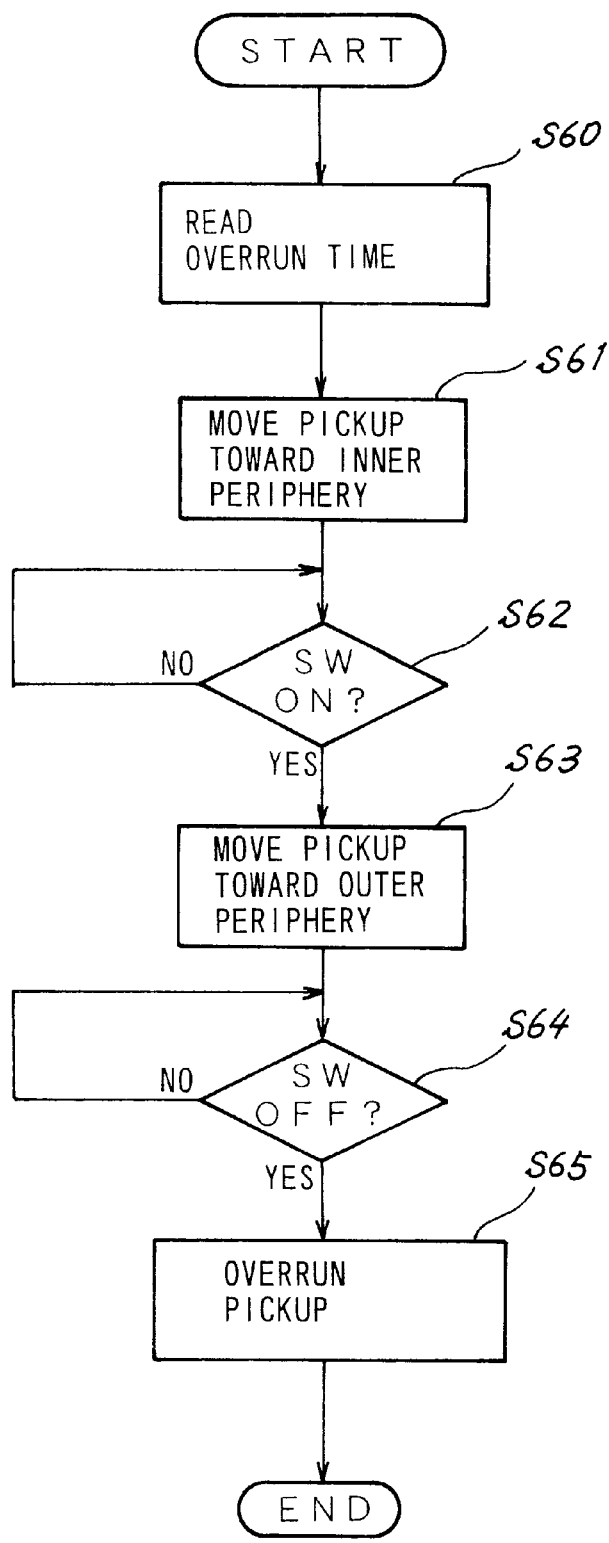
FIG. 20 is a flow chart showing a procedure for moving the pickup when recording or playback is to be started.

After the initial position of the pickup 3 has been completely adjusted, the device is deenergized. When the user thereafter energizes the device again for recording or playback, the ALU 10 first reads the overrun time from the nonvolatile memory 7 (S60) as shown in the flow chart of FIG. 20. The pickup 3 is then moved toward the disk inner periphery (S61), reversed after turning on the sensor switch SW (S62), and moved toward the disk outer periphery (S63). After the switch SW is turned off (S64), the pickup 3 is moved for the read overrun time (S65). Needless to say, the pickup 3 is moved toward the disk outer periphery if the overrun time is positive at this time, or the pickup 3 is moved toward disk inner periphery if the time is negative. The pickup 3 is positioned in the target region within the lead-in area, ready to accurately read the TOC signals. Accordingly, the device subsequently operates smoothly for recording or playback.

Although the direction of overrun of the pickup 3 is reversed when the overrun time is reduced to 0 msec according to the embodiment described above, a reference time t1, for example, 5 msec, may be set for reversing the overrun direction, such that when the overrun time is reduced to not longer than the reference time t1, the direction of overrun of the pickup 3 is reversed.

The pickup 3 may be returned to the disk inner periphery after the initial position thereof has been adjusted.

[Second Embodiment]

Figure 14A:
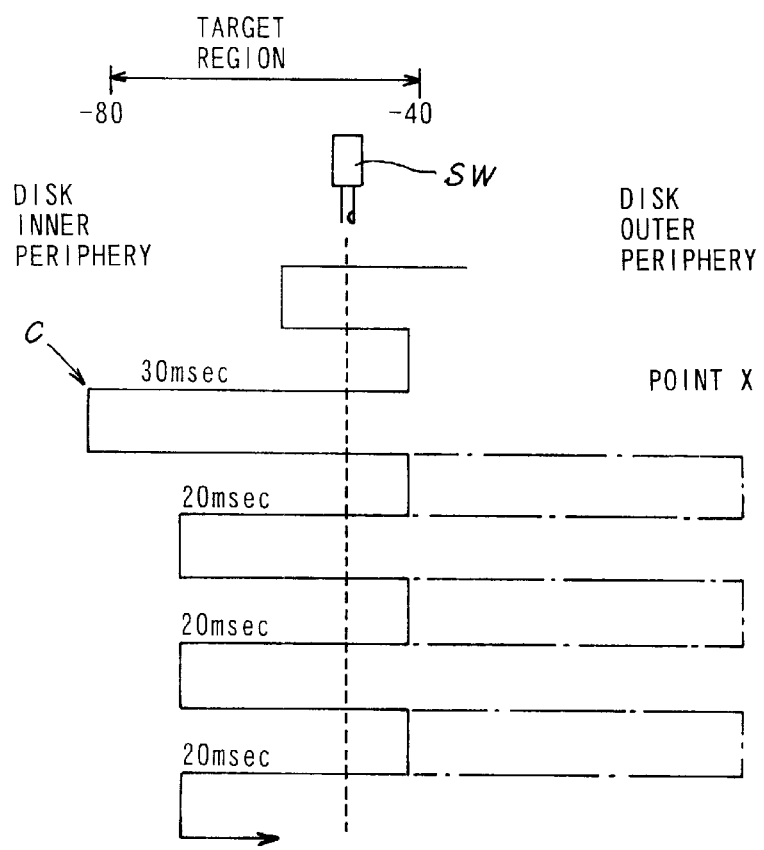
FIGS. 14A, 14B and 15 are diagrams showing relationships in position between the sensor switch and the target area according to the second embodiment.
Figure 14B:
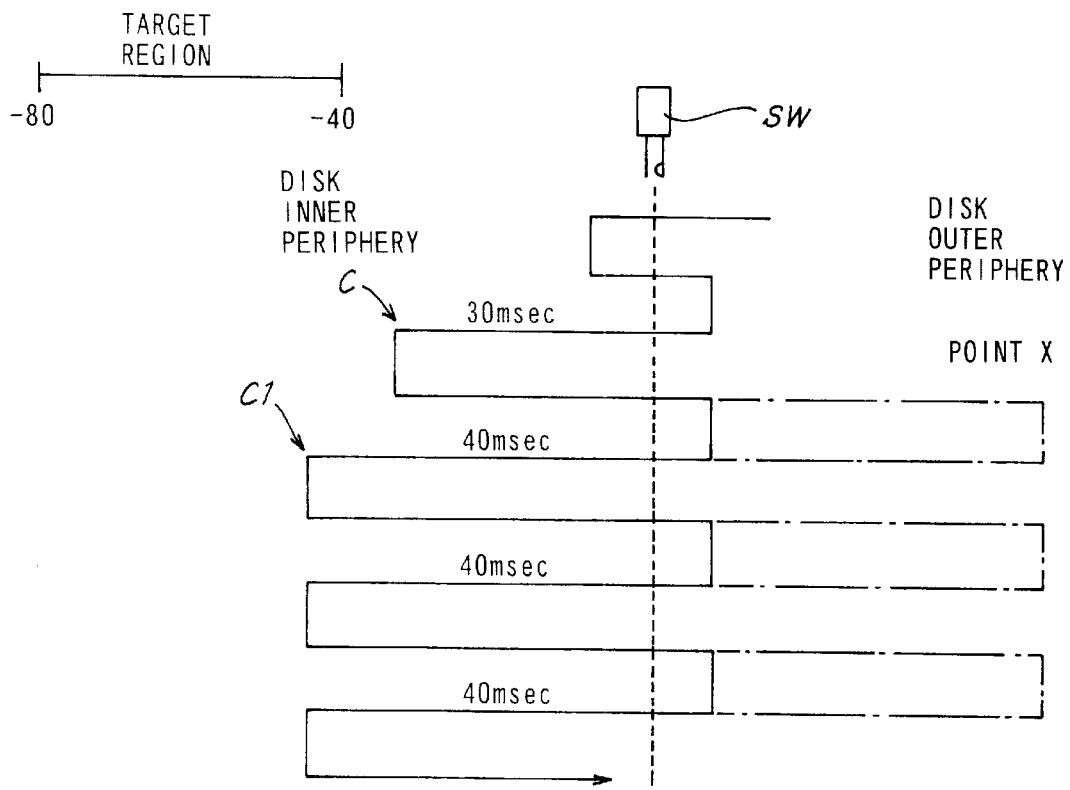
Figure 15:
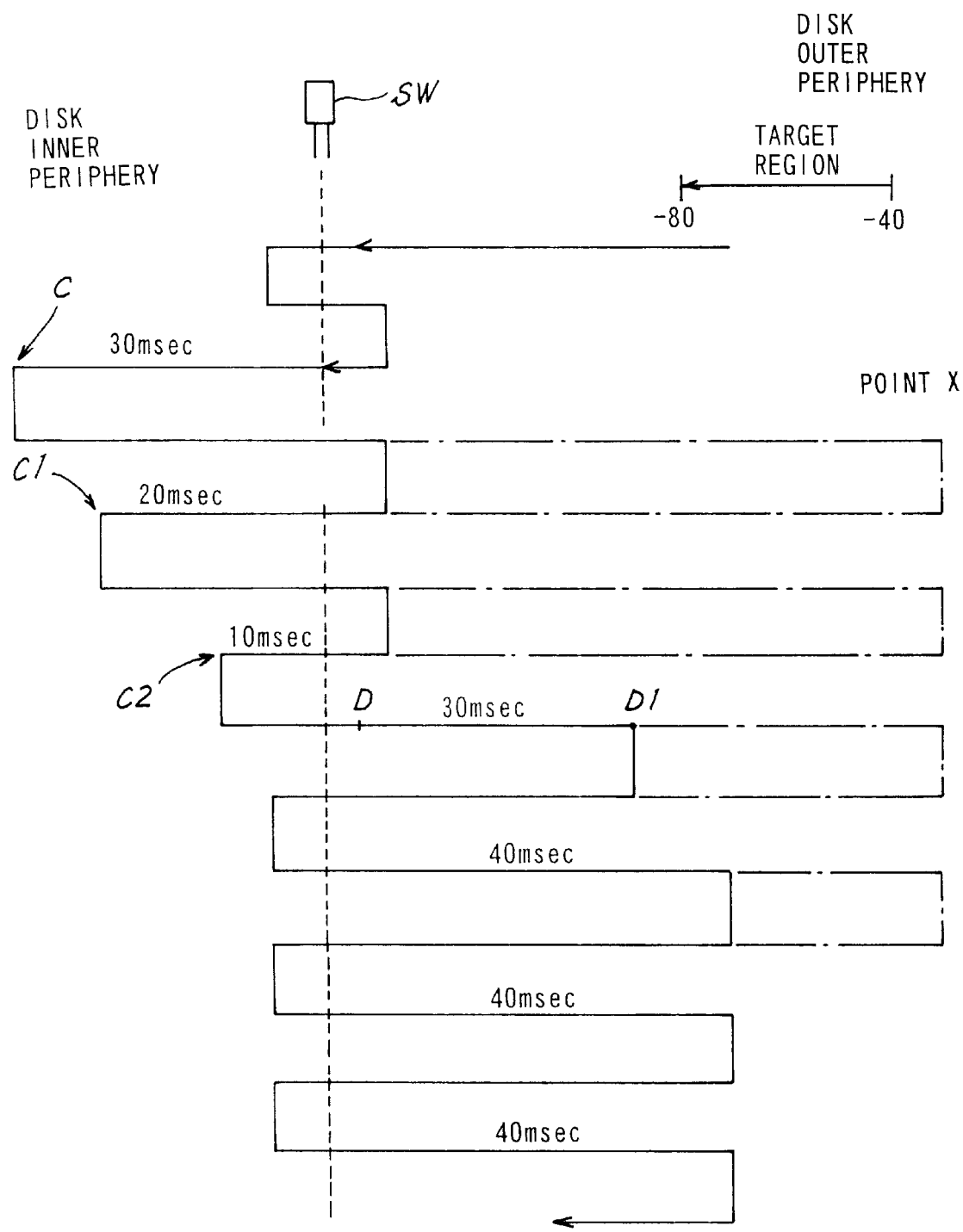

FIGS. 14A, 14B and 15 are diagrams showing relationships between the sensor switch SW and the target region according to another embodiment.

Figure 6B:
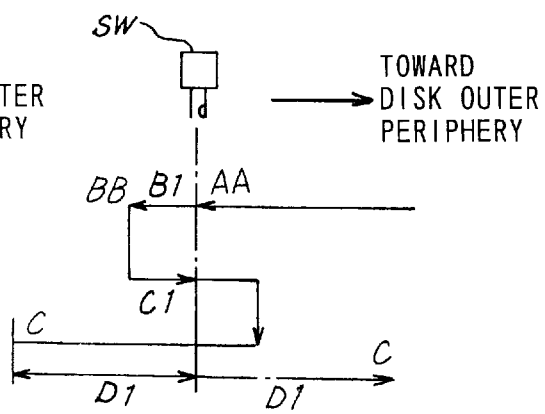
FIG. 6B is a diagram showing control for the fine adjustment of position according to a second embodiment.
Figure 16:
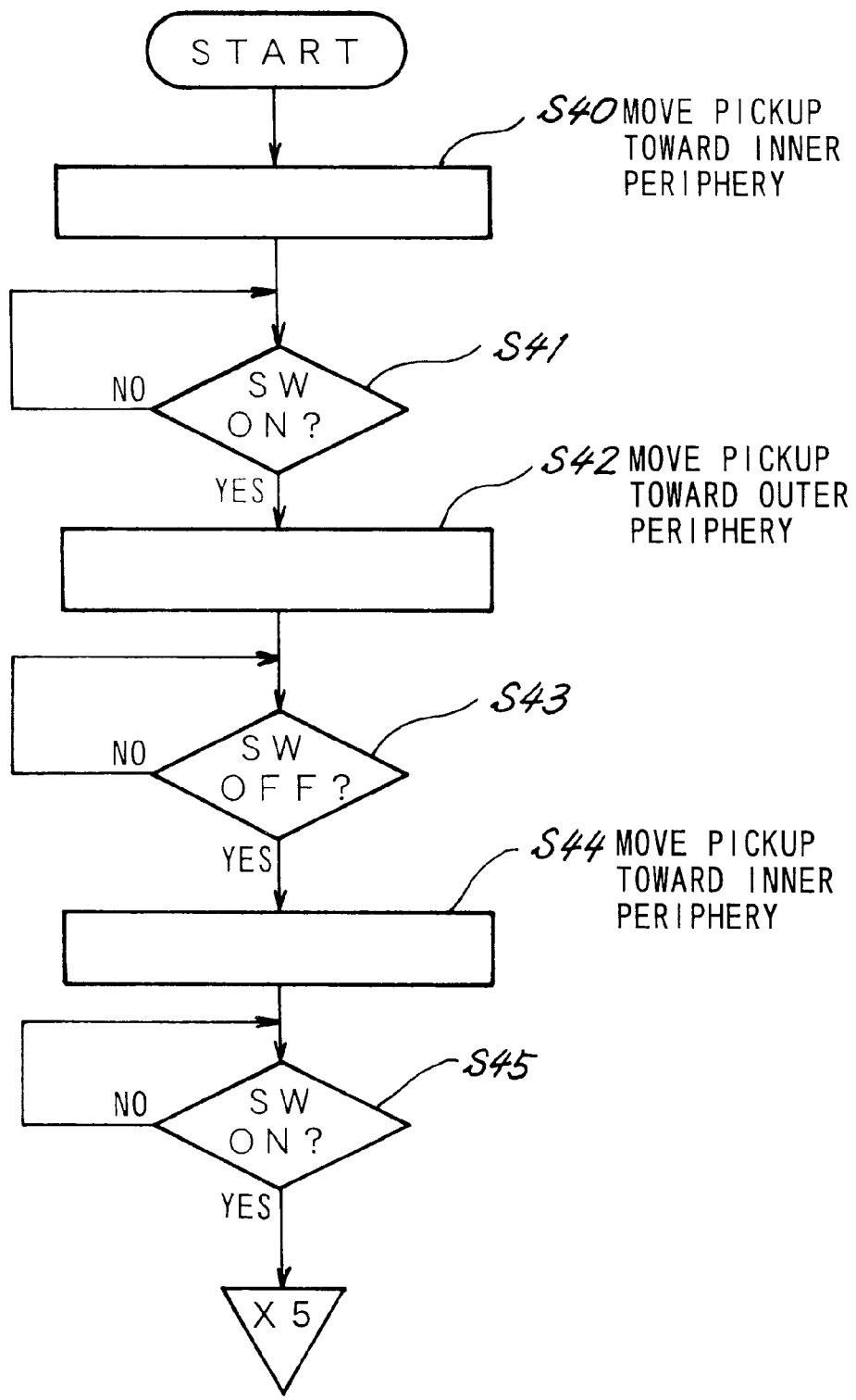
FIGS. 16 and 17 are flow charts of the position fine adjustment control of the second embodiment.
Figure 17:
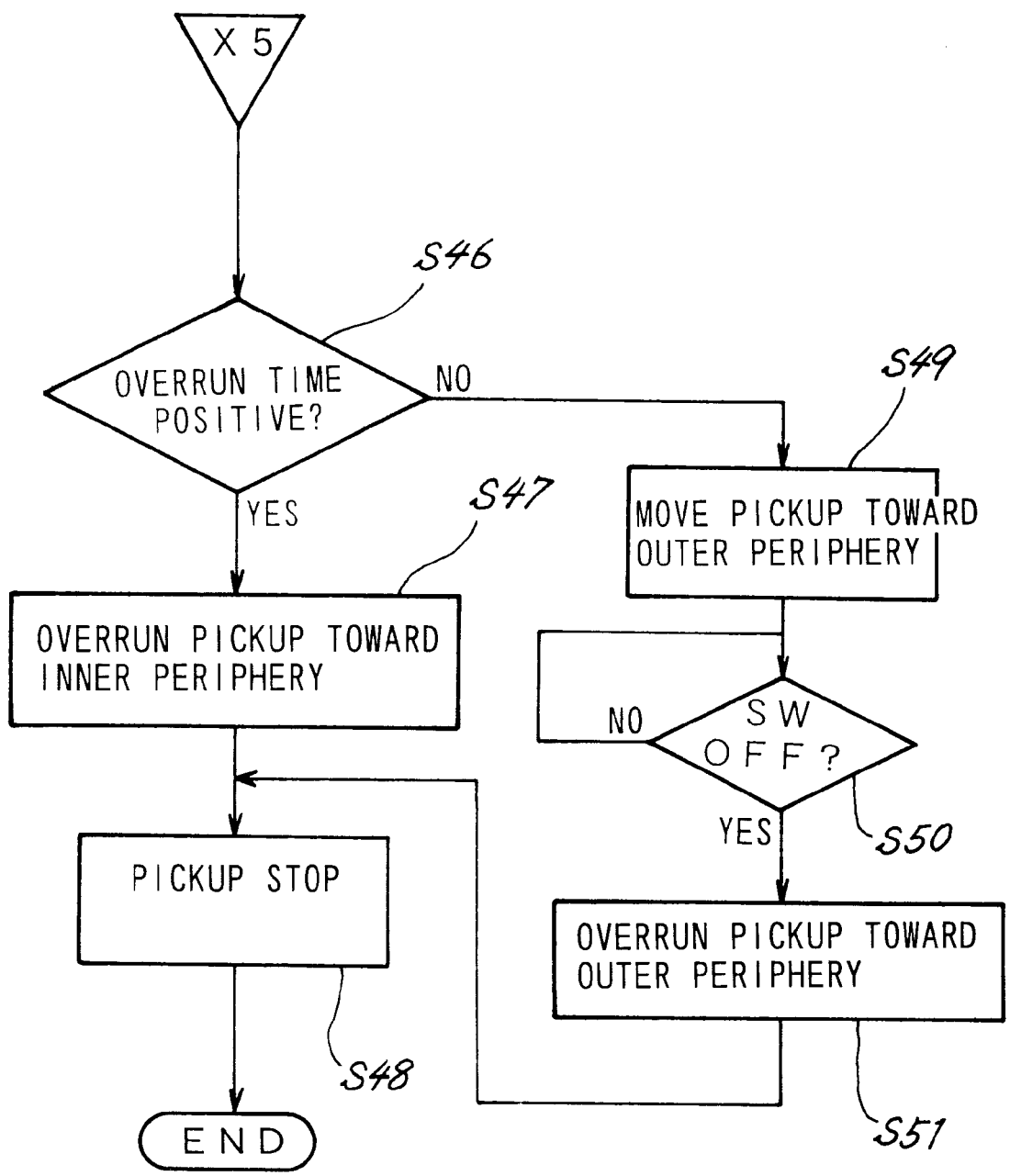

Contrary to the first embodiment, the pickup 3 is moved toward the disk inner periphery when the overrun time is positive, or the pickup 3 is moved toward the disk outer periphery if the time is negative according to this embodiment. FIG. 6B and the flow charts of FIGS. 16 and 17 show control for position fine adjustment, which differs from that of the first embodiment. The procedure for position fine adjustment control will be described below.

Control for Position Fine Adjustment

With reference to FIG. 6B, the pickup 3 is positioned as moved toward the disk outer periphery in advance. First, the pickup 3 is moved inward (S40) to turn on the sensor switch SW (S41, point AA). This reverses the direction of rotation of the motor for driving the pickup 3. The pickup comes to a halt at point BB after moving past the switch by B1 through inertia, and the direction of movement of the pickup 3 is reversed (C1) to move the pickup toward the disk outer periphery (S42). The sensor switch SW is turned off (S43).

The pickup 3 is thereafter moved toward the disk inner periphery again (S44). After the switch SW is turned on (S45), an inquiry is made as to whether overrun time D1 is positive or negative (S46). When the overrun time D1 is positive, the pickup 3 is moved toward disk inner periphery a distance corresponding to the overrun time D1 (S47). When the pickup 3 is halted (S48), the servo is turned on, and the pickup 3 recognizes the address of point C where it is located.

When the overrun time D1 is negative, the pickup 3 is moved toward the disk outer periphery (S49). After the sensor switch SW is turned off, the pickup 3 is moved toward disk outer periphery a distance corresponding to the overrun time D1 (S47) as indicated in a chain line in FIG. 6B. Upon the pickup 3 coming to a halt (S48), the servo is turned on for the pickup 3 to recognize the address of point C where the pickup 3 is positioned.

Figure 18:
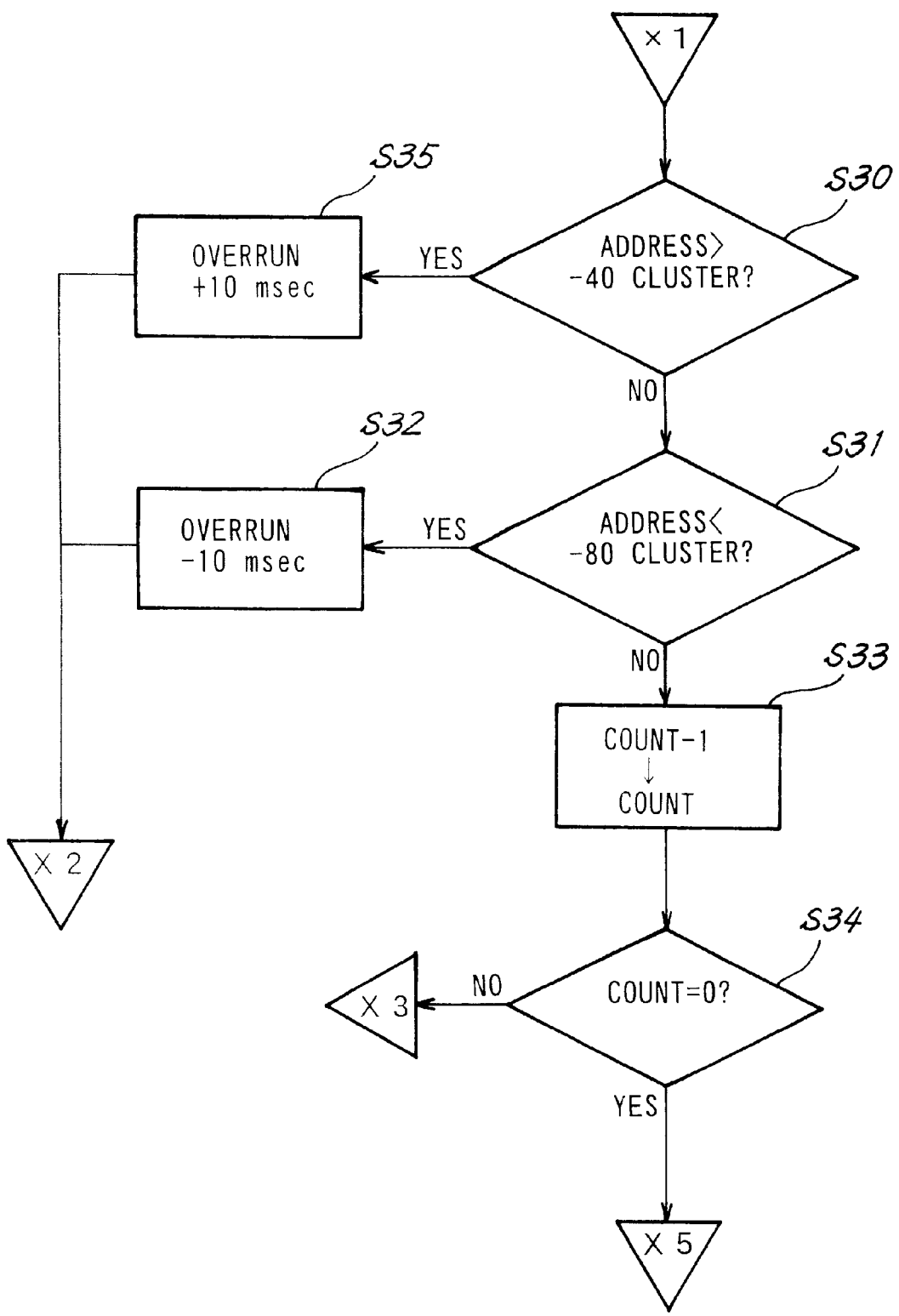
FIGS. 18 to 19 are flow charts showing a method of adjusting the initial position of the pickup.
Figure 19:
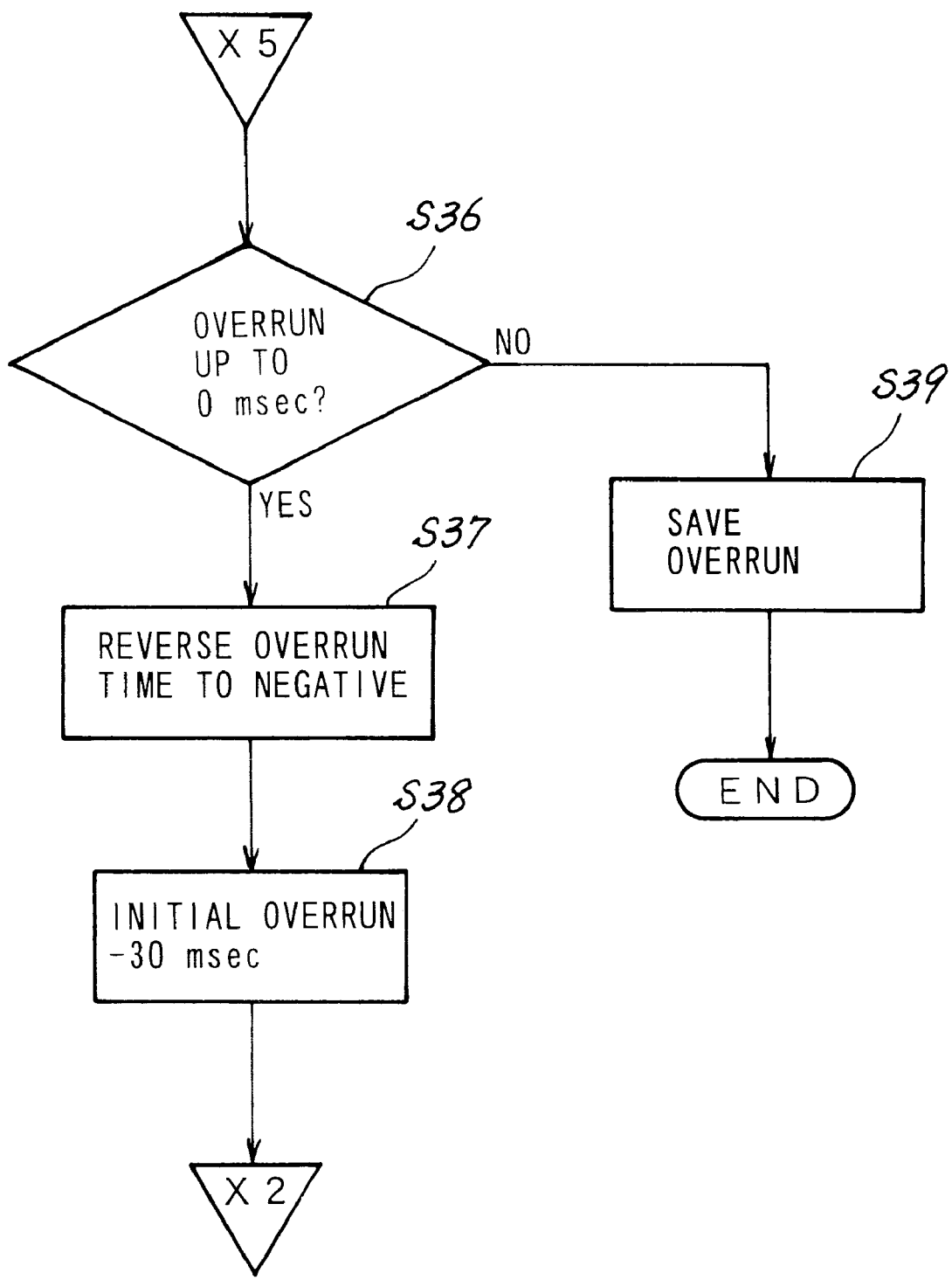

The procedure of this embodiment is the same as that of the first embodiment in that the initial overrun time and the count are set to repeat the control for position fine adjustment, followed by turning on and off the servo. The procedure is shown in the flow charts of FIGS. 10, 18 and 19. The initial overrun time D1 is set at 30 msec.

When Address C is Beyond Target Region

When the address read by the pickup 3 after overrunning is smaller than −80 cluster, that is, if the address is closer to the disk inner periphery than the target region (S31) as indicated at point C in FIG. 14A, 10 msec is subtracted from the overrun time (S32), followed by step S2 again. The overrun time is reduced to 20 msec in FIG. 14A.

When Address C is Short of Target Region

When the address read by the pickup 3 after overrunning is greater than −40 cluster, that is, if the address is closer to the disk outer periphery than the target region (S30) as indicated at point C in FIG. 14B, the pickup 3 has not reached the target region, and 10 msec is therefore added to the overrun time (S35), followed by step S2 again. The overrun time is increased to 40 msec in FIG. 14B.

After setting the overrun time, the pickup 3 is temporarily moved toward the disk outer periphery to point X (S6), and thereafter returned inward toward the sensor switch SW. After the switch SW is turned on, the pickup 3 is moved toward the disc inner periphery a distance corresponding to the calculated overrun time. The operation described above is subsequently repeated until the count is decreased to 0 (S34).

When Overrun Time is Shortened to 0 Second

When the target area is positioned closer to the disk outer periphery than the sensor switch SW as shown in FIG. 15, the address is point D, and the pickup 3 is not positioned in the target area even if the count decreases to 0, with the overrun time reduced to 0 msec (S36). Point D is a location to which the pickup 3 slightly moves toward the disk outer periphery through inertia after moving toward the disk outer periphery and turning off the sensor switch SW. Further in FIG. 15, point X is actually positioned closer to the disk outer periphery than the target region although appearing close to the target region.

At this time, the ALU 10 reverses the overrun time to be read from the RAM 12 to negative (S37). When the overrun time is made negative, the pickup 3 is caused to overrun toward the disk outer periphery, so that the overrun time to be set initially becomes −30 msec (S38), followed by step S2 of FIG. 10 again.

After the pickup 3 is halted upon lapse of the overrun time, the servo is turned on (S4), and the address is read. The servo is turned off (S7), the pickup 3 is moved toward disk inner periphery. After the sensor switch SW is turned on, the address is compared with the target region.

When the address after overrunning is smaller than −80 cluster, that is, when the address is closer to the disk inner periphery than the target region, as indicated by point D1 in FIG. 15, the pickup 3 has not reached the target region (S31), so that the overrun time is decreased by 10 msec to −40 msec (S32), followed by step S2 again.

If the address of the location where the pickup 3 is at a halt is greater than −40 cluster, that is, if the address is closer to the disk outer periphery than the target region, the pickup 3 is positioned beyond the target region (S30) although not shown, so that 10 msec is added to the overrun time, hence −20 msec (S35). The sequence then returns to step S2 again.

When the pickup 3 is brought to a halt on completion of overrun, the servo is turned on for the pickup to read the address. When the pickup 3 is positioned in the target region, the overrun time concerned is saves in the nonvolatile memory 7 (S39).

The overrun time for initial position adjustment is stored in the nonvolatile memory 7. Even after the power supply to the device is cut off, the overrun time is therefore held stored in the memory. Accordingly, when the overrun time is set in the device in advance in its manufacturing process, the pickup 3 in the standby state for recording or playback can be correctly positioned in the lead-in area even after the device is delivered to the user.

The nonvolatile memory 7 generally comprises $E^2PROM$ or the like and is usually used also for storing characteristics values such as adjustment values, for example, of servo gains, coefficient of digital filters, etc. A vacant address is utilized for storing the overrun time of the pickup 3.

Although the initial overrun time for the pickup 3 is set at 30 msec, this value is an example; other value is of course usable.

The initial adjustment of the pickup 3 is made in an adjusting step of the manufacturing process of the device after the device has been assembled. Stated more specifically, the adjustment is made according to a program stored in the ROM 11 of the computer 1 while simultaneously pressing desired keys included in the manual keys 5, 5, 5 shown in FIG. 21. It is almost unlikely for the user to press the manual keys 5, 5, 5 at the same time and determine an optional period of overrun time.

The overrun time is used for the adjusting methods of the embodiments described above, whereas the adjusted position may alternatively be obtained by calculation from the address initially read. Further alternatively, the overrun time may be stored in a memory (not shown) provided in the computer 1 and adapted to retain the stored data by power supply backup. After the device has been completed and delivered to the user, the serviceman may manipulate the keys 5, 5, 5 to compensate for variations, for example, in the drive load of the pickup 3 which occur with the lapse of time.

What is claimed is:

1. A method of adjusting the initial position of a pickup of a disk recording or playback device, the device comprising a pickup movable along a signal recording surface of a disk for detecting addresses on the disk, and a sensor switch for detecting the pickup as moved to an inner peripheral side of the disk, the initial position adjusting method comprising the steps of:

providing within a lead-in area at an inner peripheral portion of the disk a target region in which the pickup is to be positioned initially, moving the pickup from an inner periphery of the disk toward an outer periphery thereof and causing the pickup to overrun a distance corresponding to a predetermined period of time further toward the disk outer periphery after the sensor switch detects the passage of the pickup, reading an address A on the disk on completion of the overrun, returning the pickup to the disk inner periphery and halting the pickup upon the sensor switch detecting the passage of the pickup, correcting the overrun time to a shorter period if the address A is closer to the disk outer periphery than the target region, or correcting the overrun time to a longer period if the address A is closer to the disk inner periphery than the target region, repeating the movement of the pickup toward the disk outer periphery again and storing the overrun time enabling the pickup to reach the target region, repeating shortening of the overrun time, reversing the direction of overrun when the overrun time becomes not longer than a reference time t1 and if the address A then read is closer to the disk outer periphery than the target region, moving the pickup toward the disk inner periphery, repeating shortening or lengthening of the overrun time and storing the overrun time eventually enabling the pickup to be positioned in the target region, and outwardly moving the pickup as returned to a position closer to the disk inner periphery than the sensor switch to move the pickup from the position of detection of the pickup by the sensor switch a distance corresponding to the stored overrun time when recording or playback is to be started again.

2. A method according to claim 1 wherein after causing the pickup to overrun toward the disk outer periphery upon the sensor switch detecting the passage of the pickup and reading the address A, the pickup is moved further toward the disk outer periphery to a point X of predetermined address to stabilize the movement of the pickup, and is thereafter returned toward the disk inner periphery.

3. A disk recording or playback device having mounted on a chassis a pickup movable along a signal recording surface of a disk for detecting addresses on the disk, and a sensor switch for detecting the pickup as moved to an inner peripheral side of the disk, the disk recording or playback device being characterized in that the device comprises:

an arithmetic and logic unit for receiving as an input a target region within a lead-in area at an inner peripheral portion of the disk in which region the pickup is to be positioned initially, a ROM having stored therein a program comprising moving the pickup from an inner periphery of the disk toward an outer periphery thereof, causing the pickup to overrun a distance corresponding to a predetermined period of time further toward the disk outer periphery after the sensor switch detects the passage of the pickup, reading an address A on the disk on completion of the overrun, returning the pickup toward the disk inner periphery, correcting the overrun time to a shorter period if the address A is closer to the disk outer periphery than the target region, or correcting the overrun time to a longer period if the address A is closer to the disk inner periphery than the target region, and repeating the movement of the pickup toward the disk outer periphery again, and a memory for storing the overrun time eventually enabling the pickup to be positioned within the target region, the device further being characterized in that when recording or playback is to be started again, the pickup as returned to a position closer to the disk inner periphery than the sensor switch is moved outward and thereby moved from the position of detection of the pickup by the sensor switch a distance corresponding to the stored overrun time.

4. A method of adjusting the initial position of a pickup of a disk recording or playback device, the device comprising a pickup movable along a signal recording surface of a disk for detecting addresses on the disk, and a sensor switch for detecting the pickup as moved to an inner peripheral side of the disk, the initial position adjusting method comprising the steps of:

providing within a lead-in area at an inner peripheral portion of the disk a target region in which the pickup is to be positioned initially, moving the pickup from an inner periphery of the disk toward an outer periphery thereof, returning the pickup toward the disk inner periphery after the sensor switch detects the pickup and causing the pickup to overrun a distance corresponding to a predetermined period of time toward the disk inner periphery after the sensor switch detects the passage of the pickup again, reading an address C on the disk on completion of the overrun, returning the pickup to the disk outer periphery and halting the pickup upon the sensor switch detecting the passage of the pickup, correcting the overrun time to a shorter period if the address C is closer to the disk inner periphery than the target region, or correcting the overrun time to a longer period if the address C is closer to the disk outer periphery than the target region, repeating the movement of the pickup toward the disk inner periphery again and storing the overrun time enabling the pickup to reach the target region, repeating shortening of the overrun time, reversing the direction of overrun when the overrun time becomes not longer than a reference time t1 and if the address C then read is closer to the disk inner periphery than the target region, moving the pickup toward the disk outer periphery, repeating shortening or lengthening of the overrun time and storing the overrun time eventually enabling the pickup to be positioned in the target region, and outwardly moving the pickup as returned to a position closer to the disk inner periphery than the sensor switch to move the pickup from the position of detection of the pickup by the sensor switch a distance corresponding to the stored overrun time when recording or playback is to be started again.

5. A method according to claim 4 wherein in returning the pickup toward the disk outer periphery upon reading the address C, the pickup is moved further toward the disk outer periphery to a point X of predetermined address after the sensor switch detects the passage of the pickup, to stabilize the movement of the pickup, and is thereafter returned toward the disk inner periphery.

6. A disk recording or playback device having mounted on a chassis a pickup movable along a signal recording surface of a disk for detecting addresses on the disk, and a sensor switch for detecting the pickup as moved to an inner peripheral side of the disk, the disk recording or playback device being characterized in that the device comprises:

an arithmetic and logic unit for receiving as an input a target region within a lead-in area at an inner peripheral portion of the disk in which region the pickup is to be positioned initially, a ROM having stored therein a program comprising moving the pickup from an inner periphery of the disk toward an outer periphery thereof, returning the pickup toward the disk inner periphery after the sensor switch detects the pickup and causing the pickup to overrun a distance corresponding to a predetermined period of time toward the disk inner periphery after the sensor switch detects the passage of the pickup again; reading an address C on the disk on completion of the overrun, returning the pickup to the disk outer periphery and halting the pickup upon the sensor switch detecting the passage of the pickup; correcting the overrun time to a shorter period if the address C is closer to the disk inner periphery than the target region, or correcting the overrun time to a longer period if the address C is closer to the disk outer periphery than the target region, and repeating the movement of the pickup toward the disk inner periphery again; and repeating shortening of the overrun time, reversing the direction of overrun when the overrun time becomes not longer than a reference time t1 and if the address D then read is closer to the disk inner periphery than the target region, moving the pickup toward the disk outer periphery and repeating shortening or lengthening of the overrun time, and a memory for storing the overrun time eventually enabling the pickup to be positioned within the target region, the device further being characterized in that when recording or playback is to be started again, the pickup as returned to a position closer to the disk inner periphery than the sensor switch is moved outward and thereby moved from the position of detection of the pickup by the sensor switch a distance corresponding to the stored overrun time.

* * * * *